(12) United States Patent
Li et al.

(10) Patent No.: US 12,348,053 B1
(45) Date of Patent: Jul. 1, 2025

(54) WIRELESS POWER TRANSFER SYSTEM

(71) Applicant: AMAZON TECHNOLOGIES, INC., Seattle, WA (US)

(72) Inventors: Jian Li, San Jose, CA (US); Marcel Colman Eric Stieber, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 28 days.

(21) Appl. No.: 18/532,891

(22) Filed: Dec. 7, 2023

Related U.S. Application Data (60) Provisional application No. 63/480,613, filed on Jan. 19, 2023.

(51) Int. Cl.
  *H02J 50/10* (2016.01)
  *H02J 50/80* (2016.01)
  *H02K 1/12* (2006.01)
  *H02K 3/32* (2006.01)

(52) U.S. Cl.
  CPC .............. *H02J 50/10* (2016.02); *H02J 50/80* (2016.02); *H02K 1/12* (2013.01); *H02K 3/32* (2013.01)

(58) Field of Classification Search
  CPC . H02J 50/10; H02J 50/80; H02K 1/12; H02K 3/32
  USPC ......................................................... 307/104
  See application file for complete search history.

(56) References Cited

U.S. PATENT DOCUMENTS

| 2002/0130633 | A1* | 9/2002 | Bedini | .................... | H02J 7/345 |
| | | | | | 318/798 |
| 2011/0041320 | A1* | 2/2011 | Tokizawa | ............... | H02K 15/35 |
| | | | | | 29/596 |
| 2017/0274788 | A1* | 9/2017 | Zhang | ..................... | B60L 53/66 |
| 2018/0054089 | A1* | 2/2018 | Lee | ......................... | G09G 5/006 |
| 2018/0198317 | A1* | 7/2018 | Kim | ........................ | H02J 50/10 |
| 2019/0184842 | A1* | 6/2019 | Waters | .................... | H02J 50/40 |
| 2021/0354819 | A1* | 11/2021 | Hiller | .................... | B64U 50/34 |

OTHER PUBLICATIONS

"BL616/BL618 Datasheet", Bouffalo Lab, Version 0.94, Jun. 7, 2022, 52 pgs.
"EiceDRIVER", Infineon, May 28, 2020, 23 pgs. Retrieved from the Internet: URL: https://www.infineon.com/dgdl/Infineon-WCDSC006-DataSheet-v02_02-EN.pdf?fileId=5546d4626e651a41016e88a5f0511c84.

(Continued)

*Primary Examiner* — Alfonso Perez Borroto
(74) *Attorney, Agent, or Firm* — Lindauer Law, PLLC (57) ABSTRACT

Inductive power transfer across a rotary joint including a motor comprises a first portion with a magnetically permeable power transmit core with a power transmit coil and a second portion comprising a magnetically permeable power receive core with a power receive coil. The core material in the respective cores directs a time-varying electromagnetic field emitted by the power transmit coil toward the power receive coil where the field is contained. As a result, adjacent devices on a side opposite the coil that utilize magnetic fields, such as motor coils, may operate without interference. For example, a brushless direct current motor comprising a stator in the first portion and a rotor in the second portion may operate while power is transferred. Data may be wirelessly transmitted between the first portion and the second portion.

28 Claims, 5 Drawing Sheets

(56) References Cited

OTHER PUBLICATIONS

"MOSFET OptiMOS 3 Power-Transistor", Infineon, Aug. 14, 2020, 11 pgs. Retrieved from the Internet: URL: https://www.infineon.com/dgdl/BSZ097N04LSG_rev1.1.pdf?folderId=db3a3043163797a6011643468e7505a4&fileId=db3a3043163797a6011643be1d53068c.

"XMCxxxxSC Wireless Power Controller Series for Commercial and Industrial Applications", Infineon, May 2019, 41 pgs. Retrieved from the Internet: URL: https://www.infineon.com/dgdl/Infineon-XMCxxxxSC-DataSheet-v02_50-EN.pdf?fileId=5546d46269e1c019016ae9db0eab1d6a.

* cited by examiner

WIRELESS POWER TRANSFER SYSTEM

PRIORITY

This application claims priority to, and the benefit of, U.S. Patent Application Ser. No. 63/480,613 filed on Jan. 19, 2023, titled "WIRELESS POWER TRANSFER SYSTEM", the contents of which are hereby incorporated by reference into the present disclosure.

BACKGROUND

A device may need to transfer electrical power across a motor-driven rotary joint.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A wide variety of devices utilize motor driven rotational joints. For example, a robot may utilize a motor to rotate a sensor head on a mast, to rotate a portion of a manipulator arm or leg, and so forth. Portions of the device that are distal to the joint may require electrical power for operation. For example, sensors in the sensor head may require electrical power to operate, the end effector or "hand" on a robot arm may require electrical power to operate, and so forth. Traditionally electrical power has been delivered using electrical conductors that provide a physical pathway for current to flow. For example, a traditional rotary joint may utilize rotary contacts such as slip rings or a wiring harness to provide electrical power to the distal portions of the device. Rotary contacts may produce electrical arcing posing potential sources of electrical noise, ignition, and so forth. Rotary contacts also wear over time. This wear may release contaminants into the joint, require ongoing maintenance, and so forth. A wiring harness limits the freedom of the rotary joint to rotate. For example, the wires will stop rotational travel once a length limit of the wires has been reached. The wiring harness may also be subject to stress failure over time due to repeated movements. Such stress failure may result in intermittent failures, introduction of electrical transients, and so forth.

Described in this disclosure is a wireless power transfer system that may be integrated with a motor to provide transfer of substantial quantities of electrical power from one portion of the apparatus to another without limiting rotation. Power may be transferred while the motor is stationary and while the motor is operating and driving the rotation. For example, the apparatus described in this disclosure allows a motor to rotate a distal portion more than 360 degrees while delivering more than 40 watts of electrical power to the distal portion. The power may be used to operate an electrical load of the distal portion.

A first portion of the apparatus includes a first portion of a motor, such as a rotor. The motor has an axis of rotation. Arranged concentrically around the axis is a power transmit magnetic core. A power transmit coil may be linearly wound around this core. A second portion of the apparatus includes a second portion of the motor, such as a stator. Arranged concentrically around the axis is a power receive magnetic core. A power receive coil is linearly wound around this core. When assembled, the power transmit coil is proximate to the power receive coil. The cores comprise a magnetically permeable material with a permeability that is greater than air. For example, the cores may comprise soft iron, mu metal, and so forth. During power transfer, an alternating current signal is provided to the power transmit coil, and energy from the resulting electromagnetic field is inductively coupled to the power receive coil. By utilizing magnetic cores, the electromagnetic fields produced during operation are directed towards the opposing coil and generally confined. As a result, adjacent devices, such as electromagnetic coils within the motor may operate without substantial interference. Use of the magnetic cores also allows an increase in efficiency, and an increase in the power transferred. As a result, power transfers exceeding hundreds of watts may be realized.

Data may be transferred between the first portion and the second portion using one or more devices. In one implementation an optical or radio-frequency (RF) transceiver may be used to send data between the first portion and the second portion. In another implementation a modulated signal may be provided to the power transmit coil to convey data to the second portion. In a variation of this implementation, a modulated signal may be provided to the power receive coil at a different frequency to convey data to the first portion.

By using the apparatus, a rotary joint may be driven to provide a desired rotation while large quantities of power are transferred without interruption and without limiting rotational freedom. The apparatus may be used with a variety of different motor types, without impairing the operation of those different motor types.

ILLUSTRATIVE SYSTEM

Figure 1:
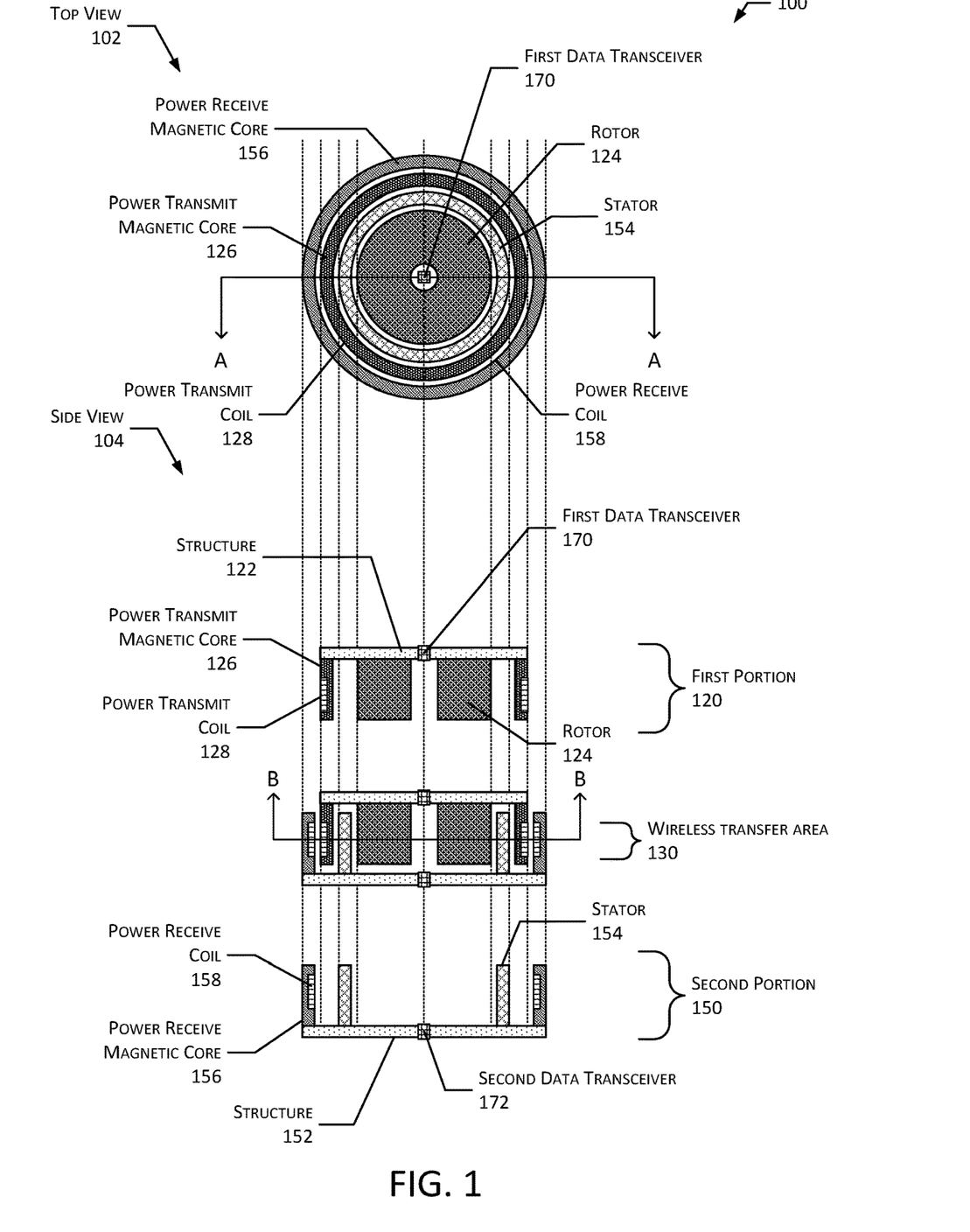
FIG. 1 illustrates a first implementation of a wireless power transfer system comprising a motor.

FIG. 1 illustrates at 100 a first implementation of a wireless power transfer system comprising a motor, according to some implementations. In this illustration a top view 102 and a side view 104 are depicted. For ease of illustration and comprehension, and not as a limitation, other components of the apparatus have been omitted. For example, an external protective housing, associated electrical circuitry, and so forth are not shown.

The top view 102 depicts a cross section along line B-B. The side views 104 depict cross sections along line A-A.

A first portion 120 of the apparatus includes a structure 122. Affixed to the structure 122 is a first portion of a motor, such as a rotor 124. The motor has a first axis about which the motor will rotate. For example, the first axis passes through the radial center of the rotor 124.

The first portion 120 includes a power transmit magnetic core 126. The power transmit magnetic core 126 comprises a magnetically permeable material. The magnetically permeable material may exhibit a magnetic permeability that is greater than air. For example, the magnetically permeable material may comprise iron, nickel, an amorphous metal alloy such as Metglas, and so forth. The power transmit magnetic core 126 may comprise a solid material, a powder solidified using a binder, a powder within a container, and so forth. The power transmit magnetic core 126 may comprise a single contiguous shape, such as a cylinder. The power transmit magnetic core 126 is arranged concentric to the first axis and the rotor 124. The power transmit magnetic core 126 may be radially symmetrical with respect to the first axis.

A power transmit coil 128 is affixed to the power transmit magnetic core 126. The power transmit coil 128 may be radially symmetrical with respect to the first axis. The power transmit coil 128 may be linearly wound on the power transmit magnetic core 126. The power transmit coil 128 may comprise a plurality of turns, forming a multiturn coil. The power transmit coil 128 comprises an electrically conductive material, such as copper. In some implementations the power transmit coil 128 may comprise individual wires wound on the power transmit magnetic core 126. In other implementations the power transmit coil 128 may comprise a flexible printed circuit that is affixed to the power transmit magnetic core 126.

In this illustration, the power transmit coil 128 is arranged on an outer face of the cylindrical power transmit magnetic core 126 that is radially furthest from the first axis. The turns of the power transmit coil 128 may be arranged to parallel one another along the outer face.

In some implementations the conductor used to form one or more of the power transmit coil 128 or the power receive coil 158 may comprise a conductive material that is deposited, printed, or formed onto the coil or an insulating substrate that is subsequently attached to the coil. In other implementations, other conductor winding or deposition patterns may be used to form one or more of the power transmit coil 128 or the power receive coil 158.

A second portion 150 of the apparatus includes a structure 152. Affixed to the structure 152 is a second portion of the motor, such as a stator 154. As mentioned earlier, the motor has the first axis about which the motor will rotate. For example, the first axis passes through the radial center of the stator 154.

The second portion 150 includes a power receive magnetic core 156. The power receive magnetic core 156 comprises a magnetically permeable material. The magnetically permeable material may exhibit a magnetic permeability that is greater than air. For example, the magnetically permeable material may comprise iron, nickel, an amorphous metal alloy such as Metglas, and so forth. The power transmit magnetic core 126 may comprise a solid material, a powder solidified using a binder, a powder within a container, and so forth. The power receive magnetic core 156 may comprise a single contiguous shape, such as a cylinder. The power receive magnetic core 156 is arranged concentric to the first axis and the stator 154. The power receive magnetic core 156 may be radially symmetrical with respect to the first axis. In some implementations the power receive magnetic core 156 may utilize a different magnetically permeable material from the power transmit magnetic core 126. For example, the power transmit magnetic core 126 may utilize iron while the power receive magnetic core 156 may utilize nickel, or vice versa.

A power receive coil 158 is affixed to the power receive magnetic core 156. The power receive coil 158 may be radially symmetrical with respect to the first axis. The power receive coil 158 may be linearly wound on the power receive magnetic core 156. The power receive coil 158 may comprise a plurality of turns, forming a multiturn coil. The power receive coil 158 comprises an electrically conductive material, such as copper. In some implementations the power receive coil 158 may comprise individual wires wound on the power receive magnetic core 156. In other implementations the power receive coil 158 may comprise a flexible printed circuit that is affixed to the power receive magnetic core 156. In this illustration, the power receive coil 158 is arranged on an inner face of the cylindrical power receive magnetic core 156 that is radially closest to the first axis. The turns of the power receive coil 158 may be arranged to parallel one another along the inner face.

When the apparatus is assembled, the power transmit coil 128 is proximate to the power receive coil 158 and the rotor 124 is proximate to the stator 154. A gap is present between the first portion 120 and the second portion 150 allowing the two portions to rotate with respect to one another without mechanical interference. In some implementations mechanical elements such as bearings, rollers, and so forth (not shown) may be present.

A wireless transfer area 130 is depicted, comprising the power transmit coil 128 and the power receive coil 158. Within the wireless transfer area 130 power is transferred inductively between the coils.

In some implementations one or more of the power transmit magnetic core 126 or the power receive magnetic core 156 may be radially asymmetrical with respect to the first axis. For example, one portion or angular arc of the magnetic core may be asymmetrically larger or smaller in a cross-sectional area, exhibit a different geometry, and so forth.

In one implementation, the asymmetry may be used to preferentially increase or decrease power transfer while the apparatus is in a particular relative angular orientation between the first portion and the second portion. For example, the power transmit magnetic core 126 may have a first segment that is larger in cross section for ⅛ of its circumference. The power receive magnetic core 156 may have a second segment that is larger in cross section for ⅛ of its circumference. When the first segment and the second segment are aligned such that they are proximate to one another, power transfer may be increased compared to the non-aligned condition.

In the implementation shown, the motor may comprise a brushless direct current (BLDC) motor with a central open shaft. The first portion 120 includes a first data transceiver 170 affixed to the structure 122 at a first end of the central open shaft. The second portion 150 includes a second data transceiver 172 affixed to the structure 154 at a second end of the central open shaft. During operation, the first data transceiver 170 and the second data transceiver 172 may be used to send data between the first portion 120 and the second portion 150. In other implementations, other techniques may be used to send data between the portions. For example, the electromagnetic field emitted by the power transmit coil 128 may be modulated to convey data to the power receive coil 158. This is discussed in more detail below.

In implementations in which the motor provides an empty or hollow shaft, the power transmit magnetic core 126, power transmit coil 128, power receive magnetic core 156, and power receive coil 158 may be arranged within the hollow shaft.

The first portion 120 and the second portion 150 may contain different portions of the motor depending on implementation. For example, in another implementation the first portion 120 may include the stator 154 while the second portion 150 may include the rotor 124.

The apparatus may be used in conjunction with a variety of different motors. For example, the apparatus may be used in conjunction with electric motors including but not limited to an alternating current electric motor, BLDC electric motor, a brushed DC electric motor, a brushless motor, a permanent magnet motor, an induction motor, an electrostatic motor, and so forth. In some implementations additional high permeability material may be placed between the motor components and power transfer components. For example, a mu metal shield may be emplaced between components of an induction motor and an adjacent power transmit magnetic core 126 or power receive magnetic core 156.

In some implementations the apparatus may be used in conjunction with non-electric motors. For example, the power transmit magnetic core 126, power transmit coil 128, power receive magnetic core 156, and power receive coil 158 may be arranged concentric to an axis of rotation of a hydraulic motor or a pneumatic motor.

Operation of the wireless power transfer system comprising the power transmit magnetic core 126, power transmit coil 128, power receive magnetic core 156, and power receive coil 158 may be independent of the operation of the motor. For example, the wireless power transfer system may transfer power whether the motor is operating or not.

In some implementations, the wireless power transfer system may be used in conjunction with a generator or a regenerative motor.

The first portion 120 and the second portion 150 may contain different portions of the motor depending on implementation. For example, in another implementation the first portion 120 may include the stator 154 while the second portion 150 may include the rotor 124.

Figure 2:
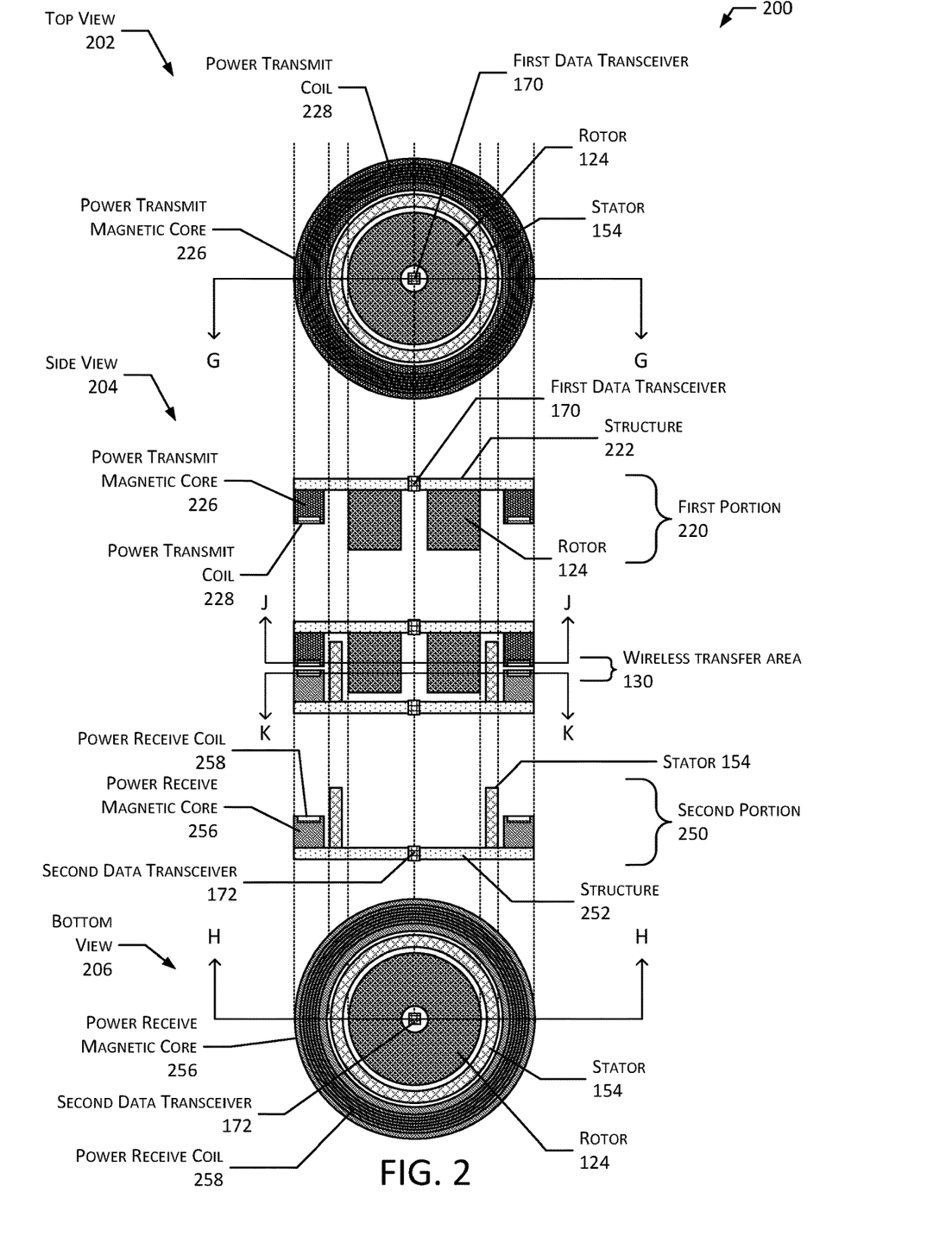
FIG. 2 illustrates a second implementation of a wireless power transfer system comprising a motor.

FIG. 2 illustrates at 200 a second implementation of a wireless power transfer system comprising a motor, according to some implementations. In this illustration a top view 202, side views 204, and a bottom view 206 are depicted. For ease of illustration and comprehension, and not as a limitation, other components of the apparatus have been omitted. For example, an external protective housing, associated electrical circuitry, and so forth are not shown.

The top view 202 depicts a cross section along line J-J. The side views 204 depict cross sections along line G-G. The bottom view 206 depicts a cross section along line H-H.

A first portion 220 of the apparatus includes a structure 222. Affixed to the structure 222 is a first portion of a motor, such as a rotor 124. The motor has a first axis about which the motor will rotate. For example, the first axis passes through the radial center of the rotor 124.

The first portion 220 includes a power transmit magnetic core 226. The power transmit magnetic core 226 comprises a magnetically permeable material. The magnetically permeable material may exhibit a magnetic permeability that is greater than air. For example, the magnetically permeable material may comprise iron, nickel, an amorphous metal alloy such as Metglas, and so forth. The power transmit magnetic core 226 may comprise a single contiguous shape, such as a cylinder. The power transmit magnetic core 226 is arranged concentric to the first axis and the rotor 124. The power transmit magnetic core 226 may be radially symmetrical with respect to the first axis.

A power transmit coil 228 is affixed to the power transmit magnetic core 226. The power transmit coil 228 may be radially symmetrical with respect to the first axis. The power transmit coil 228 may be linearly wound on the power transmit magnetic core 226. The power transmit coil 228 may comprise a plurality of turns, forming a multiturn coil. The power transmit coil 228 comprises an electrically conductive material, such as copper. In some implementations the power transmit coil 228 may comprise individual wires wound on the power transmit magnetic core 226. In other implementations the power transmit coil 228 may comprise a flexible printed circuit that is affixed to the power transmit magnetic core 226. In this illustration, the power transmit coil 228 is arranged on a lower face of the cylindrical power transmit magnetic core 226 that proximate to the second portion 250. The turns of the power transmit coil 228 may be arranged to parallel one another along the lower face.

A second portion 250 of the apparatus includes a structure 252. Affixed to the structure 252 is a second portion of the motor, such as a stator 154. As mentioned earlier, the motor has the first axis about which the motor will rotate. For example, the first axis passes through the radial center of the stator 154.

The second portion 250 includes a power receive magnetic core 256. The power receive magnetic core 256 comprises a magnetically permeable material. The magnetically permeable material may exhibit a magnetic permeability that is greater than air. For example, the magnetically permeable material may comprise iron, nickel, an amorphous metal alloy such as Metglas, and so forth. The power receive magnetic core 256 may comprise a single contiguous shape, such as a cylinder. The power receive magnetic core 256 is arranged concentric to the first axis and the stator 154. The power receive magnetic core 256 may be radially symmetrical with respect to the first axis. In some implementations the power receive magnetic core 256 may utilize a different magnetically permeable material from the power transmit magnetic core 226. For example, the power transmit magnetic core 226 may utilize iron while the power receive magnetic core 256 may utilize nickel, or vice versa.

A power receive coil 258 is affixed to the power receive magnetic core 256. The power receive coil 258 may be radially symmetrical with respect to the first axis. The power receive coil 258 may be linearly wound on the power receive magnetic core 256. The power receive coil 258 may comprise a plurality of turns, forming a multiturn coil. The power receive coil 258 comprises an electrically conductive material, such as copper. In some implementations the power receive coil 258 may comprise individual wires wound on the power receive magnetic core 256. In other implementations the power receive coil 258 may comprise a flexible printed circuit that is affixed to the power receive magnetic core 256. In this illustration, the power receive coil 258 is arranged on an upper face of the cylindrical power receive magnetic core 256 that is proximate to the first portion 220. The turns of the power receive coil 258 may be arranged to parallel one another along the upper face.

When the apparatus is assembled, the power transmit coil 228 is proximate to the power receive coil 258 and the rotor 124 is proximate to the stator 154. A gap is present between the first portion 220 and the second portion 250 allowing the two portions to rotate with respect to one another without mechanical interference. In some implementations mechanical elements such as bearings, rollers, and so forth (not shown) may be present.

The wireless transfer area 130 is depicted.

In the implementation shown, the motor may comprise a BLDC motor with a central open shaft. The first portion 220 includes a first data transceiver 170 affixed to the structure 222 at a first end of the central open shaft. The second portion 250 includes a second data transceiver 172 affixed to the structure 252 at a second end of the central open shaft. During operation, the first data transceiver 170 and the second data transceiver 172 may be used to send data between the first portion 220 and the second portion 250. In other implementations, other techniques may be used to send data between the portions. For example, the electromagnetic field emitted by the power transmit coil 228 may be modulated to convey data to the power receive coil 258. This is discussed in more detail below.

In implementations in which the motor provides an empty or hollow shaft, the power transmit magnetic core 226, power transmit coil 228, power receive magnetic core 256, and power receive coil 258 may be arranged within the hollow shaft.

The first portion 220 and the second portion 250 may contain different portions of the motor depending on implementation. For example, in another implementation the first portion 220 may include the stator 154 while the second portion 250 may include the rotor 124.

In other implementations, other geometries of wireless power transfer system may be used. For example, the faces of the magnetic cores may describe various angles, curves, or other shapes that are radially symmetrical and permit free rotation about the first axis.

Figure 3:
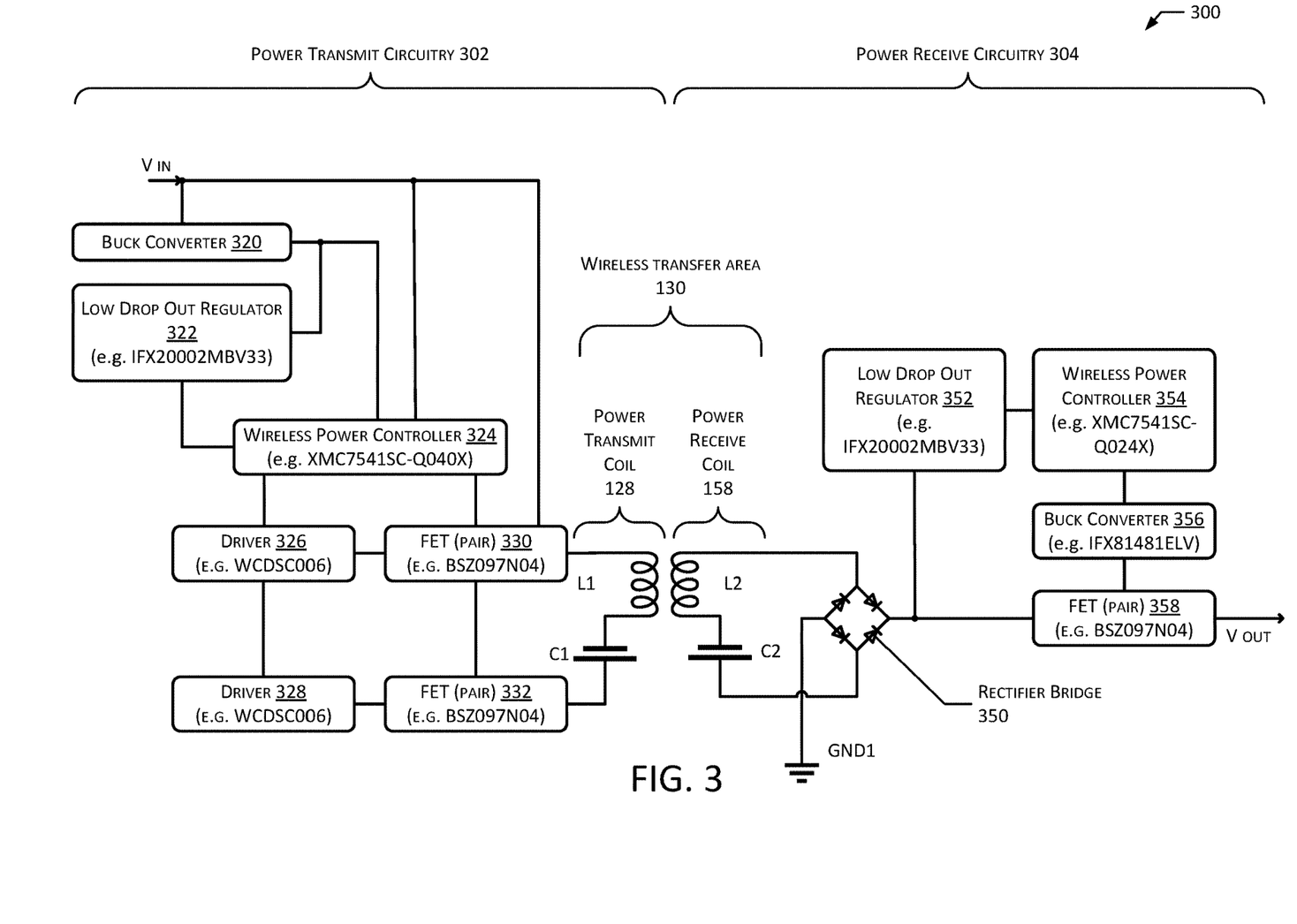
FIG. 3 illustrates a block diagram of power transmit circuitry and power receive circuitry, according to some implementations.

FIG. 3 illustrates a block diagram 300 of power transmit circuitry 302 and power receive circuitry 304, according to some implementations.

The power transmit circuitry 302 generates as output a time-varying electromagnetic signal that is provided to the power transmit coil 128 or 228. For example, the electromagnetic signal may comprise an alternating current having a frequency between 50 Hertz (Hz) and 10 megahertz (MHz).

The power transmit circuitry 302 may accept power in at Vin. Vin is connected to a first terminal of a buck converter 320, a first terminal of a wireless power controller 324, and a first terminal of a field effect transistor (FET) pair 330. A second terminal of the buck converter 320 is connected to a first terminal of a low drop out (LDO) regulator 322 and a second terminal of the wireless power controller 324. A second terminal of the LDO regulator 322 is connected to a third terminal of the wireless power controller 324.

A fourth terminal of the wireless power controller 324 is connected to a first terminal of driver 326. A second terminal of the driver 326 connects to a first terminal of driver 328.

A third terminal of the driver 326 connects to a second terminal of the FET pair 330.

A second terminal of driver 328 connects to a first terminal of FET pair 332. A second terminal of the FET pair 332 connects to a fourth terminal of the FET pair 330.

A fifth terminal of the wireless power controller 324 is connected to a third terminal of the FET pair 330. A fourth terminal of the FET pair 330 is connected to a first terminal of the power transmit coil 128 or 228 designated L1. A second terminal of the power transmit coil L1 is connected to a first terminal of capacitor C1. A second terminal of capacitor C1 is connected to a third terminal of the FET pair 332.

The power receive circuitry 304 receives the time-varying electromagnetic signal provided by the power transmit coil L1 and provides as output electric current. The electric current may be provided to an electrical load. For example, the output electric current may be used to operate the processor 504, communication interface(s) 508, and so forth of the second unit 404.

The power receive coil 158 or 258 designated L2 has a first terminal and a second terminal. A first terminal of L2 is connected to a first terminal of a rectifier bridge 350. A second terminal of L2 is connected to a first terminal of capacitor C2. A second terminal of capacitor C2 is connected to a third terminal of the rectifier bridge 350. A fourth terminal of the rectifier bridge 350 is connected to ground. A second terminal of the rectifier bridge 350 is connected to a first terminal of LDO regulator 352 and a first terminal of FET pair 358.

A second terminal of LDO regulator 352 is connected to a first terminal of wireless power controller 354. A second terminal of the wireless power controller 354 is connected to a first terminal of buck converter 356. A second terminal of the buck converter 356 is connected to a second terminal of the FET pair 358. A third terminal of the FET pair 358 is connected to Vout, providing the electrical current to a load.

In one implementation the buck converter(s) 320 or 356 may comprise Infineon part number IFX81481ELV.

In one implementation the LDO regulator 322 or 352 may comprise Infineon part number IFX20002MBV33.

In one implementation the wireless power controller 324 or 354 may comprise an Infineon part number XMC7541SC-Q040X.

In one implementation the driver 326 or 328 may comprise Infineon part WCDSC006 or WCDSC006XUMA1.

In one implementation the FET pair 330, 332, or 358 may comprise Infineon part BSZ097N04.

In other implementations other circuit arrangements may be used to drive the power transmit coil 128 or 228 and recover power from the power receive coil 158 or 258.

During operation, the power transmit circuitry 302 and the power receive circuitry 304 allows for transfer of substantial amounts of electrical power across the rotary joint. For example, the system supports transfer of more than 40 watts of electrical power to the load attached to the power receive circuitry 304. In some implementations, power transfers exceeding 500 watts may be provided.

Figure 4:
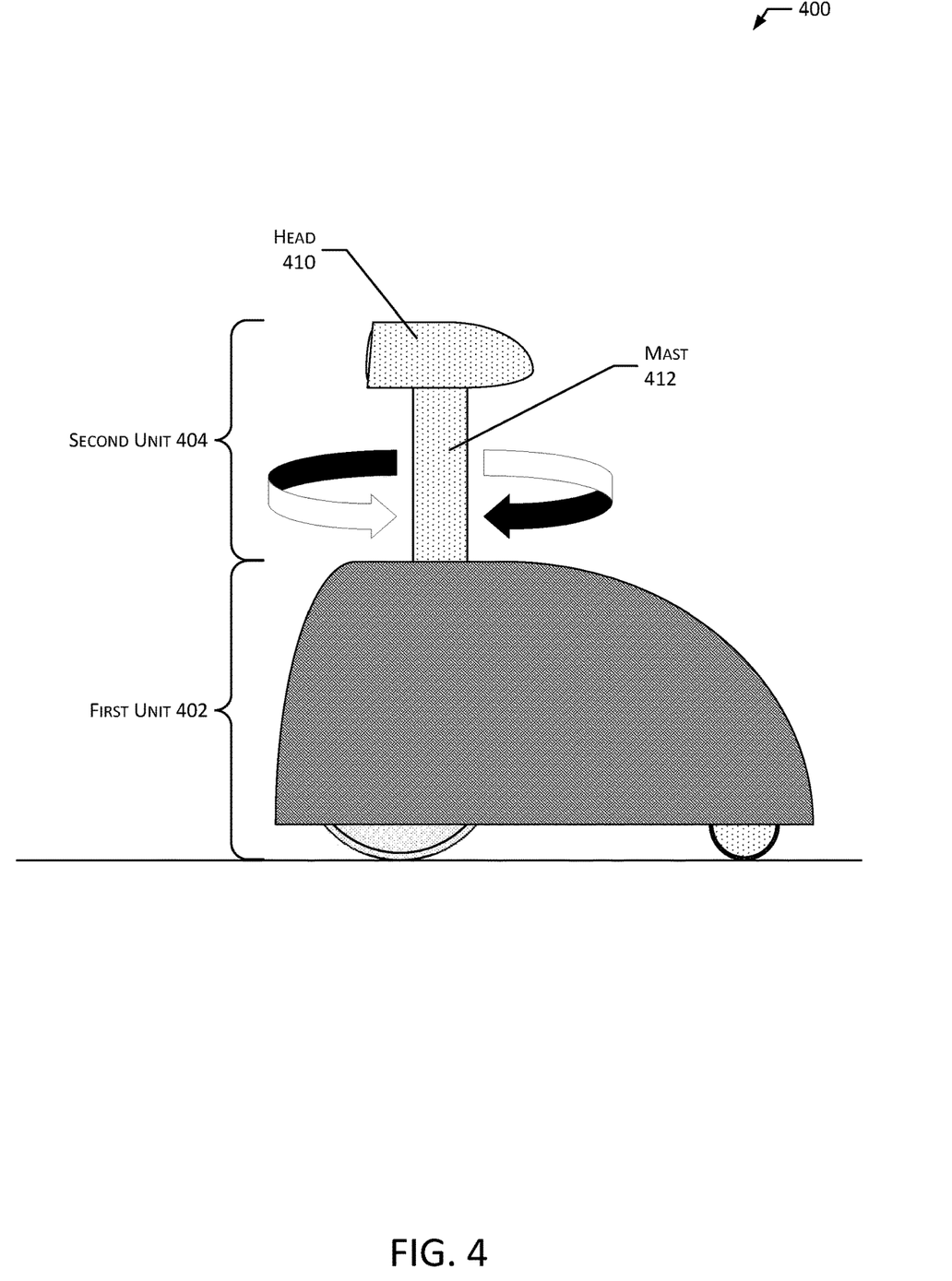
FIG. 4 illustrates a robot that includes sensors on a mast that is rotated using the wireless power transfer system, according to some implementations.

FIG. 4 illustrates at 400 a robot that includes sensors on a mast that is rotated using the wireless power transfer system and motor, according to some implementations. The robot may be divided into two portions: a first unit 402 comprising the body and a second unit 404 comprising a mast 412 that supports a head 410. In some implementations the mast 412 may be a part of the first unit 402.

The head 410 may comprise one or more sensors 516, output devices 518 (such as a projector), and so forth. One or more of the mast 412 or the second unit 404 may be rotatable with respect to the first unit 402, allowing the head 410 to pan. By using the wireless power transfer system this rotation is unencumbered, allowing rotation that exceeds 360 degrees, such as continuous rotation.

The wireless power transfer system allows the second unit 404 to be provided with electrical power for operation.

In other implementations the wireless power transfer system and motor described herein may be utilized between sections of other devices such as a ceiling mounted system, vehicle mounted sensor assembly, and so forth.

Figure 5:
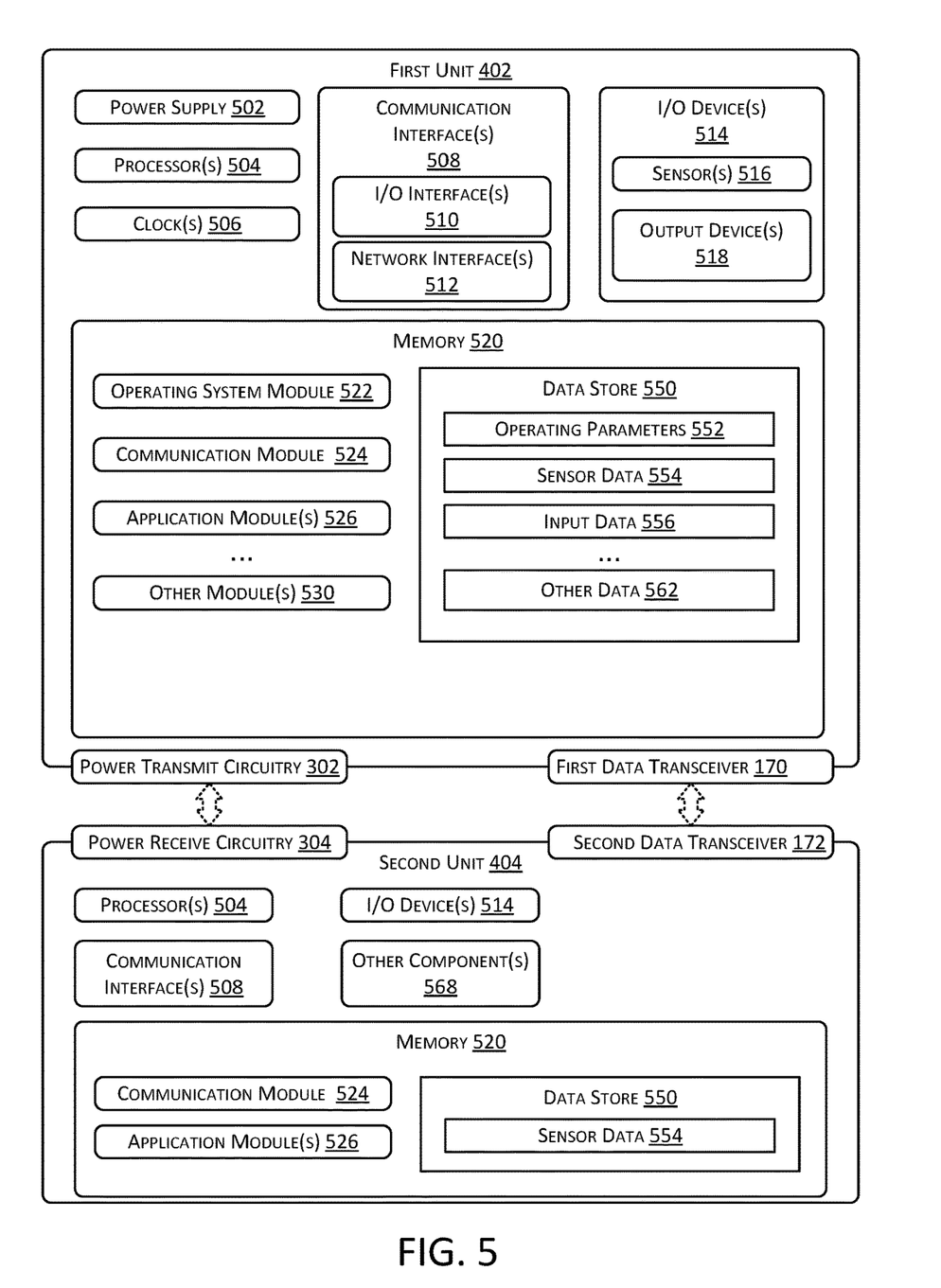
FIG. 5 illustrates a block diagram of a device such as a robot that may utilize the wireless power transfer system, according to some implementations.

FIG. 5 is a block diagram 500 of a device, such as a robot, that may utilize the wireless power transfer system, according to some implementations. The device may comprise the first unit 402 and the second unit 404. The first unit 402 and the second unit 404 are joined with a motor driven rotary joint that includes the wireless power transfer system described herein.

The first unit 402 may include a power supply 502 to provide electrical power to operate the various components in the first unit 402. For example, the power supply 502 may convert alternating current obtained from a utility line to one or more voltages. In another implementation the power supply 502 may comprise a battery.

The first unit 402 may include one or more hardware processors 504 configured to execute one or more stored instructions. The processors 504 may comprise one or more cores. The processors 504 may include microcontrollers, systems on a chip, field programmable gate arrays, digital signal processors, graphic processing units, image signal processors, coprocessors, general processing units, application specific integrated circuits, and so forth.

One or more clocks 506 may provide information indicative of date, time, ticks, and so forth. For example, the processors 504 may use data from the clock 506 to associate a particular time with an action, sensor data 554, and so forth.

The first unit 402 may include one or more communication interfaces 508 such as input/output (I/O) interfaces 510, network interfaces 512, and so forth. The communication interfaces 508 enable the first unit 402, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The i/O devices 514 may include input devices such as one or more sensors 516. The one or more sensors 516 may include cameras, lidar, radar, and so forth. The I/O devices 514 may also include output devices 518. For example, the output device 518 may comprise manipulator arms, lights, speakers, and so forth. In some embodiments, the I/O devices 514 may be physically incorporated with the first unit 402 or may be externally placed.

The network interfaces 512 may be configured to provide communications between the first unit 402 and other devices, content servers, routers, access points, servers, and so forth. The network interfaces 512 may include devices configured to couple to personal area networks (PANs), local area networks (LANs), wireless local area networks (WLANs), wide area networks (WANs), and so forth. For example, the network interfaces 512 may include devices compatible with Ethernet, Wifi, Bluetooth, Bluetooth Low Energy, ZigBee, Lora, and so forth. The first unit 402 may also include one or more buses or other internal communications hardware or software that allow for the transfer of data between the various modules and components of the first unit 402.

As shown in FIG. 5, the first unit 402 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the first unit 402. A few example functional modules are shown stored in the memory 520, although the same functionality may alternatively be implemented in hardware, firmware, or as a system on a chip (SoC). These modules may be executed as foreground applications, background tasks, daemons, and so forth.

The memory 520 may include at least one operating system (OS) module 522. The OS module 522 is configured to manage hardware resource devices such as the communication interfaces 508, the I/O devices 514, and provide various services to applications or modules executing on the processors 504. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 524 may be configured to establish communication with other devices, such as other robots, an external server, and so forth. The communications may be authenticated, encrypted, and so forth. In some implementations the communication module 524 may be configured to provide communication between the first unit 402 and the second unit 404.

Also stored in the memory 520 may be a data store 550. The data store 550 may use a flat file, database, linked list, tree, executable code, script, or other data structure to store information. The data store 550 may store one or more of operating parameters 552, sensor data 554, input data 556, or other data 562.

The operating parameters 552 may specify one or more thresholds, limits, or preferences associated with operation of the system. For example, the operating parameters 552 may specify a distance threshold for proximity detection, specified frame rate for acquisition of video by a camera, and so forth.

The sensor data 554 may comprise data acquired during operation of one or more of the sensors 516 or I/O interfaces 510. For example, the sensor data 554 may comprise image data acquired by a camera, touch data received from a touch sensor, audio data received from a microphone, and so forth.

The input data 556 may comprise data indicative of user input. In some implementations the input data 556 may be based on sensor data 554. For example, sensor data 554 comprising images acquired by a camera may be processed by a computer vision module to determine user input.

The other data 562 may comprise system maintenance logs, error handling information, and so forth.

In some implementations, the data store 550 or a portion of the data store 550 may be distributed across one or more other devices, servers, network attached storage devices, and so forth.

One or more application modules 526 may provide various functionality. For example, an application module 526 may receive data or a signal from the second unit 404 that is indicative of input from one or more sensors 516. Responsive to this data or signal, the application module 526 may determine occurrence of an event such as identifying a registered user, determining the location of a door, and so forth.

The first unit 402 may comprise the power transmit circuitry 302, as described above.

The first unit 402 may comprise a first data transceiver 170. The first data transceiver 170 may comprise a transmitter to send a signal and a receiver to detect a signal. The data transceiver 170 may utilize light or radio frequencies. For example, an optical transceiver may use light emitting diodes (LEDs) and photodetectors to send and receive data between the first unit 402 and the second unit 404 using infrared or visible light. In another example, a radio frequency (RF) transceiver may be used to establish communication between the first unit 402 and the second unit 404.

In some implementations unidirectional communication may utilized. For example, the first unit 402 may only send data and the second unit 404 may only receive data. Contrariwise, the second unit 404 may only send data and the first unit 402 may only receive data. In other implementations, bidirectional communication may be provided.

In some implementations the power transmit circuitry 302 may be used to send data to the power receive circuitry 304. Data transmission circuitry may be connected to, or integrated into, the power transmit circuitry 302. The signal emitted from the power transmit coil 128 may be modulated to encode data. Data reception circuitry may be connected to, or integrated into, the power receive circuitry 304. The signal received by the power receive coil 158 may be demodulated to recover the data. In one implementation the circuitry may be designed to facilitate bidirectional communication. In this implementation, the power receive coil 158 may be used to transmit a signal that is received by the power transmit coil 128.

The second unit 404 may comprise the power receive circuitry 304.

The second unit 404 may comprise the second data transceiver 172. The second data transceiver 172 may comprise a transmitter to send a signal and a receiver to detect a signal. As described above, the first data transceiver 170 and the second data transceiver 172 may be used to transfer data between the first unit 402 and the second unit 404.

The second unit 404 may comprise one or more processors 504, memory 520, one or more communication interfaces 508, and one or more I/O devices 514. The second unit 404 may also comprise other components 568.

The memory 520 of the second unit 404 may store a communication module 524. In some implementations the communication module 524 may be configured to provide communication between the first unit 402 and the second unit 404. The communications between the first unit 402 and the second unit 404 may be authenticated, encrypted, and so forth.

The memory 520 of the second unit 404 may store one or more application modules 526 that provide various functionality associated with the second unit 404. For example, an application module 526 may process sensor data 554 from a sensor 516 onboard the second unit 404 and determine input data 556.

The memory 520 of the second unit 404 may store other data, not illustrated in this figure. For example, sensor data 554 acquired using the sensors 516 of the second unit 404, output data for presentation using one or more output devices 518, and so forth may be stored.

Modules described herein, may provide various processing functions such as de-noising, filtering, and so forth. Processing of sensor data 554, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; and Willow Garage of Menlo Park, California, USA. In another implementation, functions available in the OKAO machine vision library as promulgated by Omron Corporation of Kyoto, Japan, may be used to process the sensor data 554. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 554 or other data 562. For example, the ANN may be trained using a supervised learning algorithm such that object identifiers are associated with images of particular objects within training images provided to the ANN. Once trained, the ANN may be provided with the sensor data 554 and produce output indicative of the object identifier.

In some implementations the second unit 404 may omit one or more of the components described above. For example, the second unit 404 may omit a processor 504, memory 520, and so forth. The communication interface 508 may comprise circuitry to generate or direct signals to the second data transceiver 172. Processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may include the use of instructions provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate processing devices or computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the structures and techniques described above can be utilized in a variety of devices and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   a first portion comprising:
      a first structure;
      a motor stator affixed to the first structure, wherein the motor stator has a first axis;
      a first core affixed to the first structure, the first core comprising a magnetically permeable material that is radially symmetrical with respect to the first axis;
      a first coil affixed to the first core, wherein the first coil is radially symmetrical with respect to the first axis; and
      power transmit circuitry connected to the first coil; and
   a second portion comprising:
      a second structure;
      a motor rotor affixed to the second structure;
      a second core affixed to the second structure, the second core comprising a magnetically permeable material that is radially symmetrical with respect to the first axis;
      a second coil affixed to the second core, wherein the second coil is radially symmetrical with respect to the first axis, and further wherein the first coil is proximate to the second coil during operation; and
      power receive circuitry connected to the second coil.

2. The apparatus of claim 1, further comprising:
   an electrical load associated with the second portion; and
   wherein the power receive circuitry delivers at least 40 watts to the electrical load during operation.

3. The apparatus of claim 1, wherein the motor stator and the motor rotor form a brushless direct current motor.

4. An apparatus comprising:
   a first portion comprising:
      a first structure;
      a first portion of a motor that is affixed to the first structure;
      a first core affixed to the first structure, the first core comprising a magnetically permeable material that is radially symmetrical with respect to a first axis;
      a first coil affixed to the first core, wherein the first coil is radially symmetrical with respect to the first axis; and
      power transmit circuitry connected to the first coil; and
   a second portion comprising:
      a second structure;
      a second portion of the motor that is affixed to the second structure;
      a second core affixed to the second structure, the second core comprising a magnetically permeable material that is radially symmetrical with respect to the first axis;
      a second coil affixed to the second core, wherein the second coil is radially symmetrical with respect to the first axis, and further wherein the first coil is proximate to the second coil during operation; and
      power receive circuitry connected to the second coil.

5. The apparatus of claim 4, wherein the power receive circuitry delivers at least 40 watts of output during operation.

6. The apparatus of claim 4, wherein the motor comprises one of:
   an alternating current electric motor,
   a brushless direct current (DC) electric motor,
   a brushed DC electric motor,
   a brushless motor,
   a permanent magnet motor,
   an induction motor,
   a hydraulic motor, or
   a pneumatic motor.

7. The apparatus of claim 4, wherein magnetic permeability of the first core and the second core are greater than air.

8. The apparatus of claim 4, wherein the first core has a first magnetic permeability and the second core has a second magnetic permeability that differs from the first magnetic permeability.

9. The apparatus of claim 4, the first portion further comprising a first transceiver and the second portion further comprising a second transceiver, wherein the first transceiver is configured to communicate with the second transceiver.

10. The apparatus of claim 9, wherein a central open shaft extends along a portion of the first axis and the first transceiver is located at a first end of the central open shaft and the second transceiver is located at a second end of the central open shaft.

11. The apparatus of claim 4, further comprising:
   data transmission circuitry connected to the power transmit circuitry, wherein during operation the data transmission circuitry modulates a signal emitted from the first coil to send data; and
   data reception circuitry connected to the power receive circuitry, wherein during operation the data reception circuitry demodulates the signal to receive the data.

12. The apparatus of claim 4, wherein a frequency emitted by the first coil during operation is between 50 Hertz and 10 megahertz.

13. The apparatus of claim 4, wherein the first coil is linearly wound on the first core and the second coil is linearly wound on the second core.

14. The apparatus of claim 4, wherein the first coil and the second coil each comprise a plurality of turns of wire.

15. An apparatus comprising:
    a first portion comprising:
       a first portion of a motor, wherein the motor has a first axis of rotation;

a first core comprising a first magnetically permeable material that is concentric to the first axis;
a first coil affixed to the first core; and
transmit circuitry connected to the first coil; and
a second portion comprising:
a second portion of the motor;
a second core comprising a second magnetically permeable material that is concentric to the first axis;
a second coil affixed to the second core, wherein the first coil is proximate to the second coil during operation; and
receive circuitry connected to the second coil.

16. The apparatus of claim 15, wherein the first magnetically permeable material and the second magnetically permeable material comprise a solid or a powder having a magnetic permeability greater than air.

17. The apparatus of claim 15, the first portion further comprising a first transceiver and the second portion further comprising a second transceiver, wherein the first transceiver is configured to communicate with the second transceiver.

18. The apparatus of claim 15, further comprising:
data transmission circuitry connected to the transmit circuitry, wherein during operation the data transmission circuitry modulates a signal emitted from the first coil to send data; and
data reception circuitry connected to the receive circuitry, wherein during operation the data reception circuitry demodulates the signal to receive the data.

19. The apparatus of claim 15, wherein the first coil is linearly wound on the first core and the second coil is linearly wound on the second core.

20. The apparatus of claim 15, wherein the first coil and the second coil each comprise a plurality of turns of wire.

21. An apparatus comprising:
a motor stator;
a motor rotor encircling the motor stator;
a first coil encircling the motor stator and the motor rotor, the first coil being physically coupled to the motor stator;
a second coil encircling the motor stator and the motor rotor, the second coil being physically coupled to the motor rotor so as to rotate with the motor rotor;
a first magnetic core component physically coupled to the first coil and to the motor stator; and
a second magnetic core component physically coupled to the second coil and to the motor rotor so as to rotate with the motor rotor.

22. The apparatus of claim 21, wherein the apparatus comprises power transmit circuitry coupled to the first coil and power receive circuitry coupled to the second coil.

23. The apparatus of claim 21, wherein the apparatus comprises power transmit circuitry coupled to the second coil and power receive circuitry coupled to the first coil.

24. The apparatus of claim 21, wherein the second coil encircles the first coil.

25. The apparatus of claim 21, wherein, with respect to a first plane extending perpendicular in all directions from an axis of rotation of the motor rotor, the first coil is disposed on a first side of the plane in an orientation generally parallel to the plane and the second coil is disposed on a second side of the plane in an orientation generally parallel to the plane.

26. An apparatus comprising:
a motor rotor;
a motor stator encircling the motor rotor;
a first coil encircling the motor stator and the motor rotor, the first coil being physically coupled to the motor stator;
a second coil encircling the motor stator and the motor rotor, the second coil being physically coupled to the motor rotor so as to rotate with the motor rotor;
a first magnetic core component physically coupled to the first coil and to the motor stator; and
a second magnetic core component physically coupled to the second coil and to the motor rotor so as to rotate with the motor rotor.

27. The apparatus of claim 26, wherein the first coil encircles the second coil.

28. The apparatus of claim 26, wherein, with respect to a first plane extending perpendicular in all directions from an axis of rotation of the motor rotor, the first coil is disposed on a first side of the plane in an orientation generally parallel to the plane and the second coil is disposed on a second side of the plane in an orientation generally parallel to the plane.

* * * * *